(12) United States Patent
Li

(10) Patent No.: US 7,728,719 B2
(45) Date of Patent: Jun. 1, 2010

(54) SIGNAL-TRANSMITTING AND MULTI-RECEIVING METHOD OF DETECTING OBSTACLE AND PARKING SENSOR APPARATUS USING THE SAME

(76) Inventor: Shih-Hsiung Li, 8F-1, No. 23, Sec. 1, Hangchow S. Rd., Taipei (TW)

( * ) Notice: Subject to any disclaimer, the term of this patent is extended or adjusted under 35 U.S.C. 154(b) by 282 days.

(21) Appl. No.: 12/072,950

(22) Filed: Feb. 29, 2008

(65) Prior Publication Data
US 2008/0218324 A1  Sep. 11, 2008

(30) Foreign Application Priority Data
Mar. 7, 2007  (TW) ............................. 96107807 A

(51) Int. Cl.
*B60Q 1/00* (2006.01)

(52) U.S. Cl. .................. 340/435; 340/436; 340/438; 340/903; 701/301

(58) Field of Classification Search ............. 340/435, 340/436, 425.5, 438, 517, 932.2, 903, 933; 701/96, 301
See application file for complete search history.

(56) References Cited

U.S. PATENT DOCUMENTS

| | | | |
|---|---|---|---|
| 6,289,282 B1 * | 9/2001 | Hassler et al. ............... | 701/301 |
| 6,326,886 B1 * | 12/2001 | Hoffsommer ............... | 340/435 |
| 6,492,902 B2 * | 12/2002 | Nishimoto et al. .......... | 340/506 |
| 7,248,153 B2 * | 7/2007 | Danz et al. .................. | 340/435 |
| 2002/0130770 A1 * | 9/2002 | Keyworth et al. ........... | 340/436 |
| 2002/0171739 A1 * | 11/2002 | Yamada ...................... | 348/148 |

* cited by examiner

*Primary Examiner*—Toan N Pham
(74) *Attorney, Agent, or Firm*—Frenkel & Associates, P.C.

(57) ABSTRACT

A parking sensor apparatus has a microprocessor and multiple ultrasonic sensors. The microprocessor uses a time division transmitting method to control only one ultrasonic sensor to output an ultrasonic detecting signal. In addition, after one ultrasonic detecting signal is output, all ultrasonic sensor are controlled to be in receiving status. Therefore, the microprocessor receives the reflected detecting signals from the ultrasonic sensors and obtains preset distances defined between adjacent ultrasonic sensors to calculate the shortest distance between the vehicle and the obstacle. Further, since only one ultrasonic sensor outputs the ultrasonic detecting signal at a time point, the microprocessor clearly determines that the reflected detecting signal is corresponding to the present ultrasonic sensor, that is controlled to output the ultrasonic detecting signal.

4 Claims, 6 Drawing Sheets

SIGNAL-TRANSMITTING AND MULTI-RECEIVING METHOD OF DETECTING OBSTACLE AND PARKING SENSOR APPARATUS USING THE SAME

BACKGROUND OF THE INVENTION

1. Field of the Invention

The present invention relates to a detecting obstacle method and apparatus using the same, especially to a signal-transmitting and multi-receiving method of detecting obstacle and parking sensor apparatus using the same.

2. Description of Related Art

A vehicle has a rear parking sensor apparatus to detect an obstacle behind the vehicle and determine a distance from the sensor to the obstacle with ultrasonic sound when backing a vehicle. The parking sensor apparatus operates on principles similar to radar but operates at ultrasonic frequencies rather than radio frequencies. The parking sensor apparatus outputs an ultrasonic detecting signal to detect whether any obstacle is behind the rear of the vehicle and a transmitting route of the ultrasonic detecting signal is like a horn sharp.

In general, the parking sensor apparatus is attached to the rear of the vehicle and has a controller and two ultrasonic sensors. When the parking sensor apparatus is turned on, the controller controls one of them to transmit a first ultrasonic detecting signal and then waits to receive the first ultrasonic detecting signal reflected by an obstacle through the present operative ultrasonic sensor until a preset period is ended. Then the controller controls to the other ultrasonic sensor to transmit a second ultrasonic detecting signal and then waits to receive the second ultrasonic detecting signal reflected through the present operative ultrasonic sensor.

Based on the foregoing description, the controller alternatively controls two ultrasonic sensors to detect whether any obstacle exists behind the rear of the vehicle since the parking sensor apparatus uses a time division detecting method. The time division detecting method prevents all ultrasonic sensors from interfering with multiple reflected detecting signal, that are output from the all ultrasonic sensors at the same time.

However, when the time division detecting method is used to another parking sensor apparatus having at least four ultrasonic sensors, the parking sensor apparatus may require more time to determine the obstacle, that is existed behind the vehicle.

For example, if the controller needs t=60 ms to complete one transmitting and receiving procedure for each ultrasonic sensor, a driving period for each ultrasonic sensor is about 4t=4×60=240 ms. When one obstacle suddenly exits in a second detecting area of the second ultrasonic sensor and the second transmitting and receiving procedure is just ended, the obstacle is detected after 240 ms. That is, if the speed of the vehicle is 20 km/hr to back along a straight line, the obstacle is detected after the vehicle has to back 1.3 m since the obstacle exists in the second detecting area. Therefore, when the parking sensor apparatus having at least four ultrasonic sensors uses the time division detecting method, the parking sensor apparatus may require more time to determine the obstacle.

SUMMARY OF THE INVENTION

The main objective of the present invention is to provide a new detecting method for a parking sensor apparatus having at least four ultrasonic sensors to increase speed of determining obstacle.

The parking sensor apparatus has a microprocessor and multiple ultrasonic sensors. The microprocessor uses a time division transmitting method to control only one ultrasonic sensor to output an ultrasonic detecting signal. In addition, after one ultrasonic detecting signal is output, all ultrasonic sensor are controlled to be in receiving status. Therefore, the microprocessor receives the reflected detecting signals from the ultrasonic sensors and obtains preset distances defined between adjacent ultrasonic sensors to calculate the shortest distance between the vehicle and the obstacle. Further, since only one ultrasonic sensor outputs the ultrasonic detecting signal at a time point, the microprocessor clearly determines that the reflected detecting signal is corresponding to the present ultrasonic sensor, that is controlled to output the ultrasonic detecting signal.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
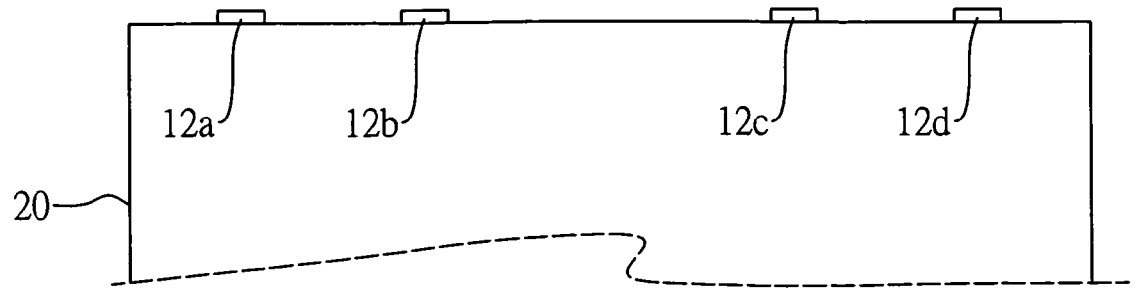
FIG. 1 is a schematic view of a parking sensor apparatus attached to a rear of a vehicle in accordance with the present invention.

The present invention comprises a parking sensor apparatus and a signal-transmitting and multi-receiving method of detecting obstacle close to vehicle. The signal-transmitting and multi-receiving method is applied to the parking sensor apparatus having a controller and multiple ultrasonic sensors. With reference to FIG. 1, in preferred embodiment there are four ultrasonic sensors (12a, 12b, 12d 12d) attached on a rear (20) of the vehicle.

Figure 2A:
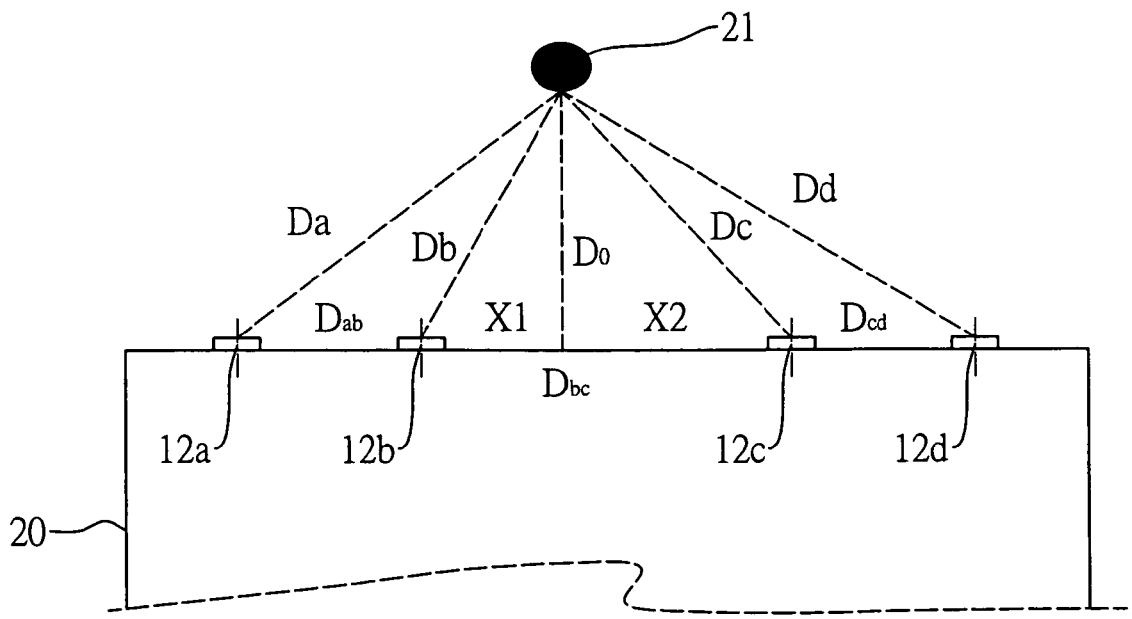
FIG. 2A is schematic view showing different distances between each ultrasonic sensor of the parking sensor apparatus and a first obstacle in accordance with the present invention.
Figure 2B:
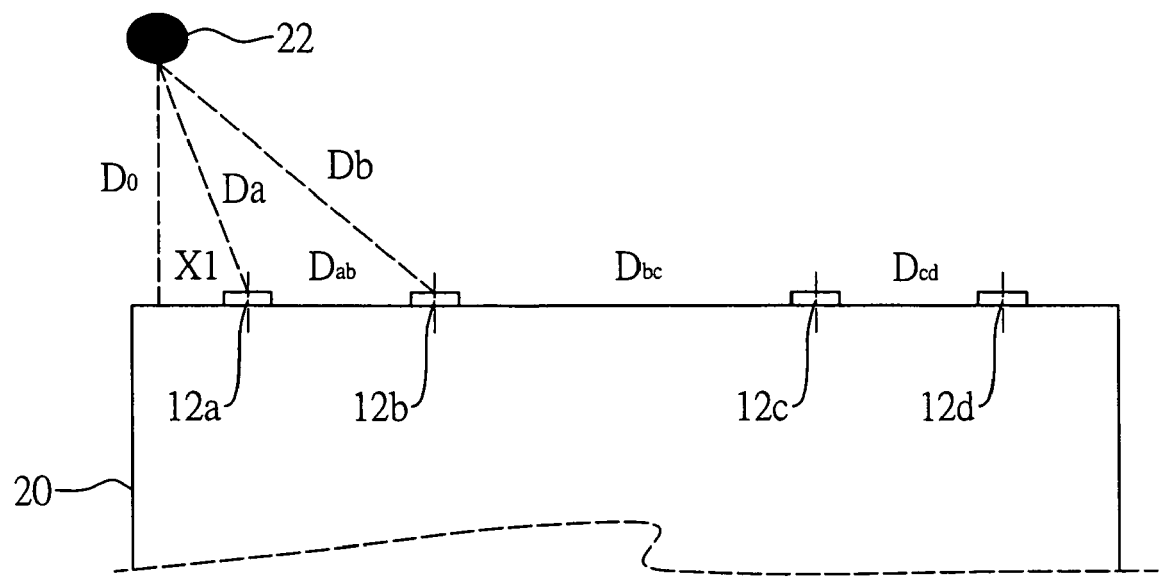
FIG. 2B is a schematic view showing different distances between the two ultrasonic sensors and a second obstacle in accordance with the present invention.
Figure 3:
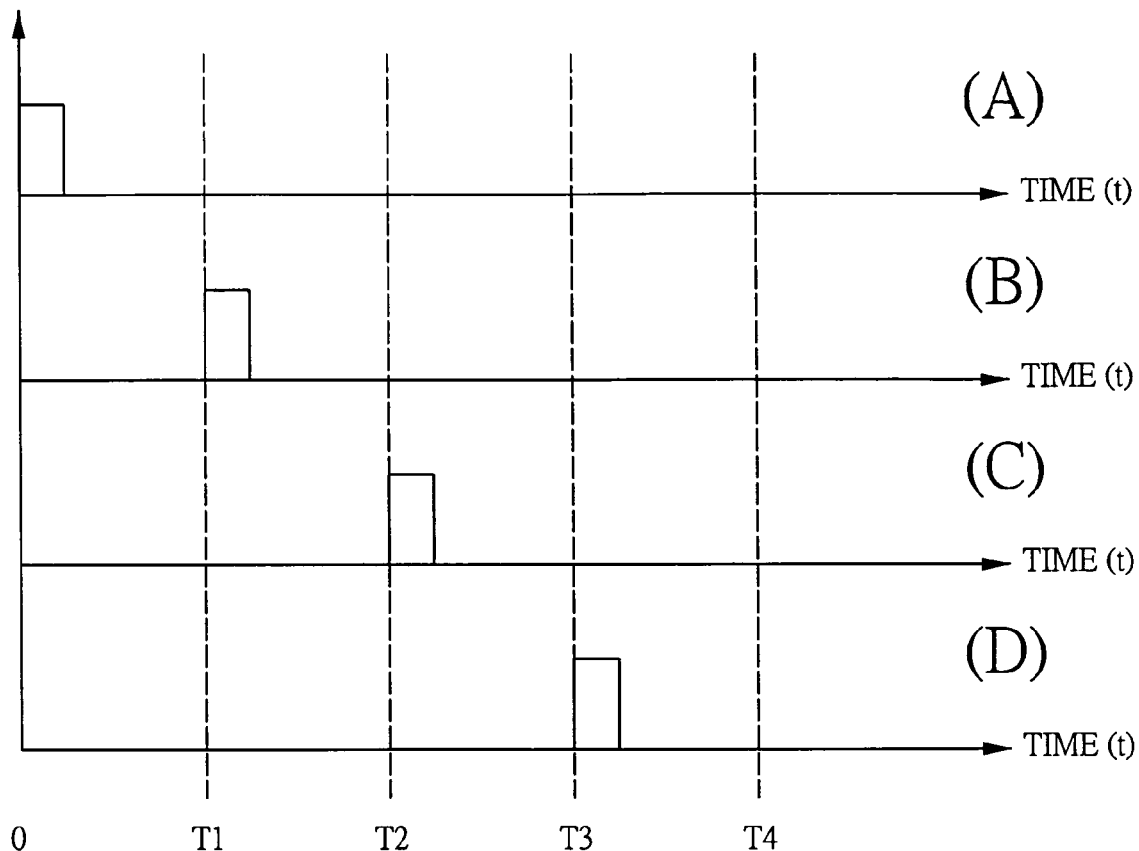
FIG. 3 is time sequence diagram for controlling four ultrasonic sensors in accordance with the present invention.
Figure 4A:
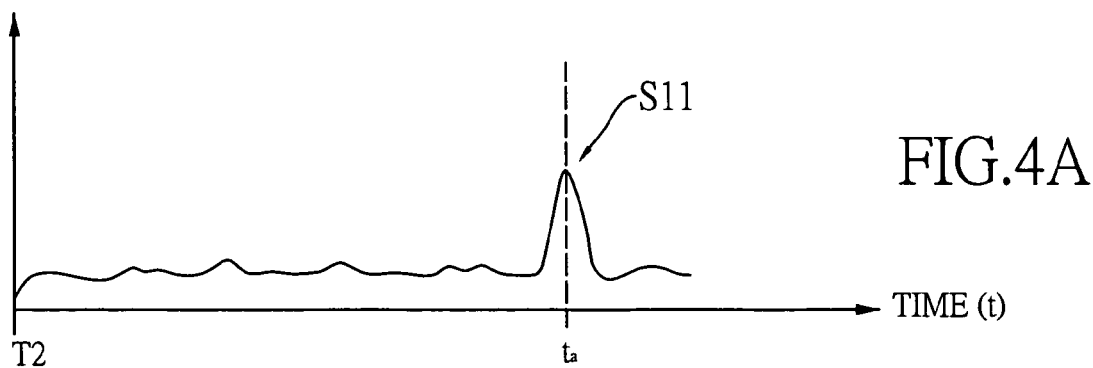
FIG. 4A to 4D are waveforms of four reflected ultrasonic signals from four ultrasonic sensors of the parking sensor apparatus in accordance with the present invention.
Figure 4B:
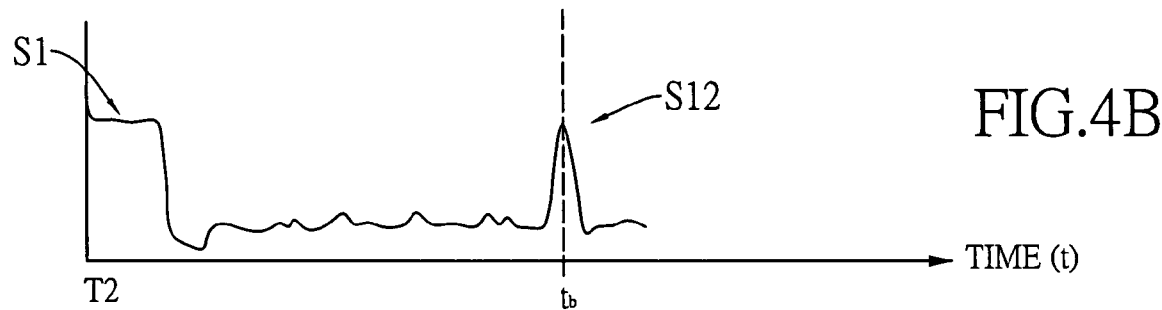
Figure 4C:
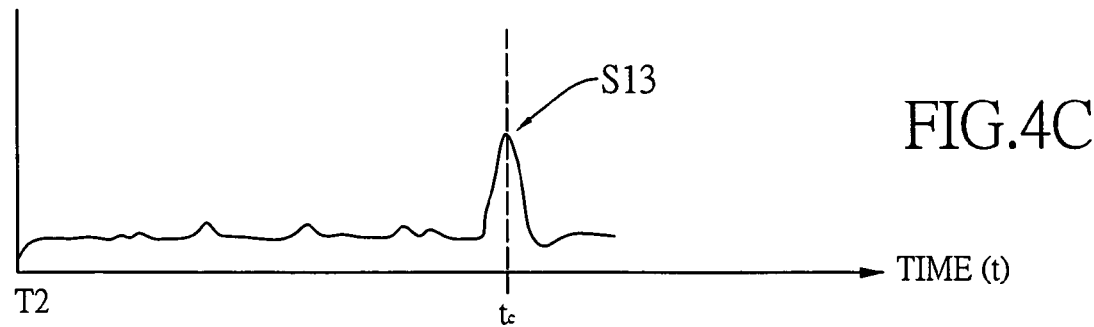
Figure 4D:
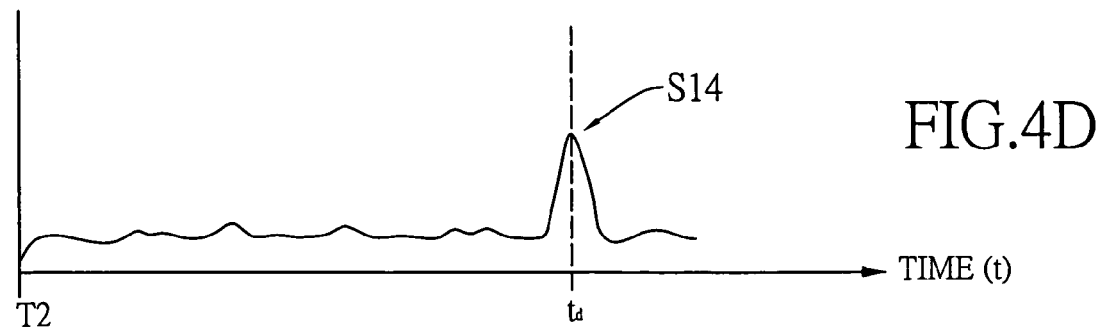

With further reference to FIG. 2A, the controller has a time period and multiple preset distances (Dab, Dbc, Dcd), each of which is defined between two adjacent ultrasonic sensors (12a, 12b) (12b, 12c) (12c, 12d) attached on the rear (20) of the vehicle. With further reference to FIG. 3(A) to (D), the controller controls the four ultrasonic sensors (12a to 12d) to output an ultrasonic detecting signal sequentially. After one ultrasonic sensor (12a, 12b, 12c, or 12d) outputs the ultrasonic detecting signal, the controller controls four ultrasonic sensors (12a to 12d) in receiving status. For example, in first time period (0 to T1) the controller controls four ultrasonic sensors (12a to 12d) in receiving status after the controller controls the first ultrasonic sensor (12a) to output a first ultrasonic detecting signal at time point (0). Therefore, the controller determines whether any obstacle behind the vehicle by checking a reflected detecting signal received by any ultrasonic sensor (12a, 12b, 12c, or 12d). When the first time period is ended, the controller controls the second ultrasonic sensor (12b) to output a second ultrasonic detecting signal at time point (T2) and then controls all ultrasonic sensors (12a to 12d) in the receiving status in the second time period (T1 to T2). When the second time period (T1 to T2) is ended, the controller controls the third ultrasonic sensor (12c) in transmitting status at a time point (T3) and then controls all ultrasonic sensors (12a to 12d) in receiving status in third time period (T2 to T3). When the third time period (T2 to T3) is ended, the controller controls the four ultrasonic sensor (12d) in transmitting status at the time point (T4) and then controls all ultrasonic sensors (12a to 12d) in receiving status in the fourth time period (T3 to T4).

With further reference to FIG. 2A, if an obstacle (21) exists in the middle-rear area behind the rear (20) of the vehicle, each ultrasonic sensor (12a, 12b, 12c, 12d) will receive the reflected ultrasonic signal even only one ultrasonic detecting signal is output. However, since distances between the obstacle (21) and the ultrasonic sensors (12a, 12b, 12c, 12d) are different, one ultrasonic sensor (12b) that is close to the obstacle (21) receives the reflected ultrasonic signal first.

With further reference to FIGS. 4A to 4D, during the second time period (T2 to T3), the second ultrasonic sensor (12b) is controlled to output a second ultrasonic detecting signal. After that, each ultrasonic sensor (12a, 12b, 12c, or 12d) is controlled in receiving status. When a transmitting route of the second ultrasonic detecting signal passes through the obstacle shown in FIG. 2A, the second ultrasonic detecting signal is reflected by the obstacle (21). Since the second and third ultrasonic sensors (12b, 12c) are close to the obstacle (21), two reflected ultrasonic signals (S12, S13) are respectively received by the second and third ultrasonic sensors (12b, 12c) shown in FIGS. 4B and 4C. After that, two reflective ultrasonic signals (S11, S14) are respectively received by the first and fourth ultrasonic sensors (12a, 12d), shown in FIG. 4A and FIG. 4D. With reference to FIGS. 4A to 4D, four reflected ultrasonic signals (S11, S12, S13, S14) are received at different time points ($t_a$, $t_b$, $t_c$, $t_d$).

At the time, the controller obtains the four reflected ultrasonic signals (S11, S12, S13, S14) through the ultrasonic sensors (12a to 12d) and then calculates a shortest distance between the rear (20) of the vehicle and the obstacle (21) shown in FIG. 2A. Since the second ultrasonic sensor (12b) is controlled to output the second ultrasonic detecting signal at time point (T2), the controller calculates a first $a_0$ time difference from T2 to $t_a$, a second time difference from T2 to $t_b$, a third time difference from T3 to $t_c$, and a fourth time difference from T4 to $t_d$. Then the controller further calculates a first, second, third and fourth distances (Da, Db, Dc, Dd) according to the first to fourth time differences. Since the controller has preset distance (Dab, Dbc, Dcd) between adjacent ultrasonic sensors (12a, 12b) (12b, 12c) (12c, 12d), the controller calculates the distance Do by trigonometric function. That is, the controller lists following trigonometric equations.

$$D_0^2 = D_a^2 - (X1 + D_{ab})^2 \quad (1)$$

$$D_0^2 = D_b^2 - X1^2 \quad (2)$$

$$D_0^2 = D_d^2 - (X2 + D_{cd})^2 \quad (3)$$

$$D_0^2 = D_c^2 - X2^2 \quad (4)$$

The controller further obtains X1 and $D_0$ by the equations (1) and (2) or obtains X2 and $D_0$ by the equations (3) and (4). Therefore, the controller obtains $D_0$ and obtain the shortest distance ($D_0$) between the rear (20) of the vehicle and the obstacle (21).

With further reference to FIG. 2A, if the obstacle (21) exits in first and second detecting areas, the first and second ultrasonic sensor (12a, 12b) detects the obstacle (21). That is, the controller still obtains the shortest distance between the rear (20) of the vehicle and the obstacle (21) by the equations (1) and (2). In this case, since the obstacle (21) is shown in the first and second detecting areas, the controller still detects the obstacle (21) quickly. For example, if the obstacle (21) is shown after the second transmitting and receiving is just ended. The controller will determine that the obstacle (21) exists when the first transmitting and receiving procedure is executed. If each transmitting and receiving procedure requires 60 ms, the maximum delay time to determining the obstacle will be about 120 ms.

Figure 5:
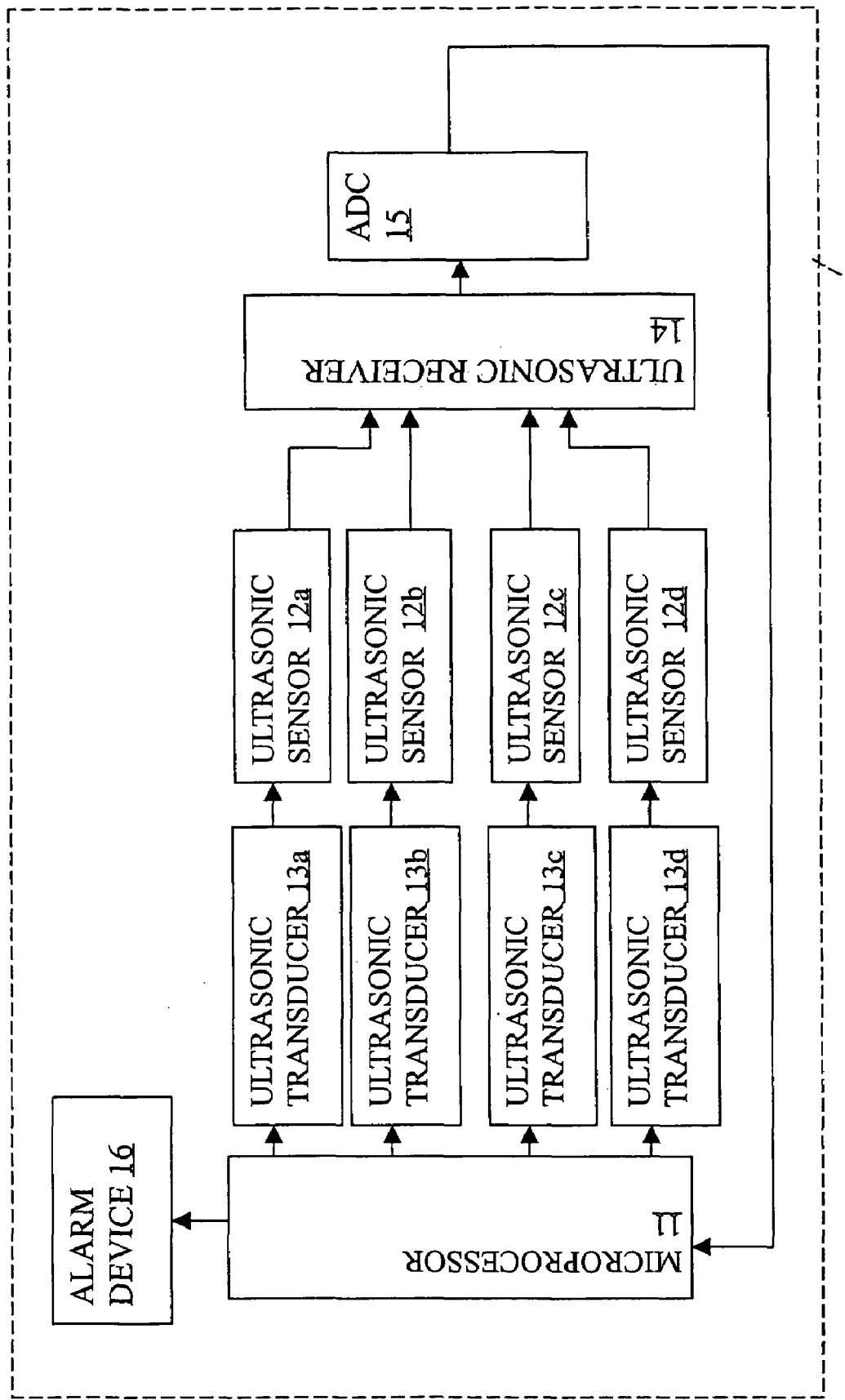
FIG. 5 is a functional block diagram of the parking sensor apparatus in accordance with the present invention.

The foregoing single-transmitting and multi-receiving method of detecting obstacle is implemented by a parking sensor apparatus. With reference to FIG. 5, the controller has a microprocessor (11), multiple ultrasonic transducers (13a to 13d), an ultrasonic receiver (14), an analogy to digital converter (15) and an alarm unit (16). The microprocessor (11) has a single-transmitting and multi-receiving procedure, a time period and multiple preset distances.

The ultrasonic sensors (12a to 12d) are respectively and electronically connected to outputs of the microprocessor (11) through an ultrasonic transducer (13a to 13d), and respectively and electronically connected to corresponding inputs of the microprocessor (11) through the ultrasonic receiver (14) and the analogy to digital converter (15).

The alarm device (16) is electronically connected to the output of the microprocessor (11) so the microprocessor (11) drives the alarm device (16) to work.

Figure 6:
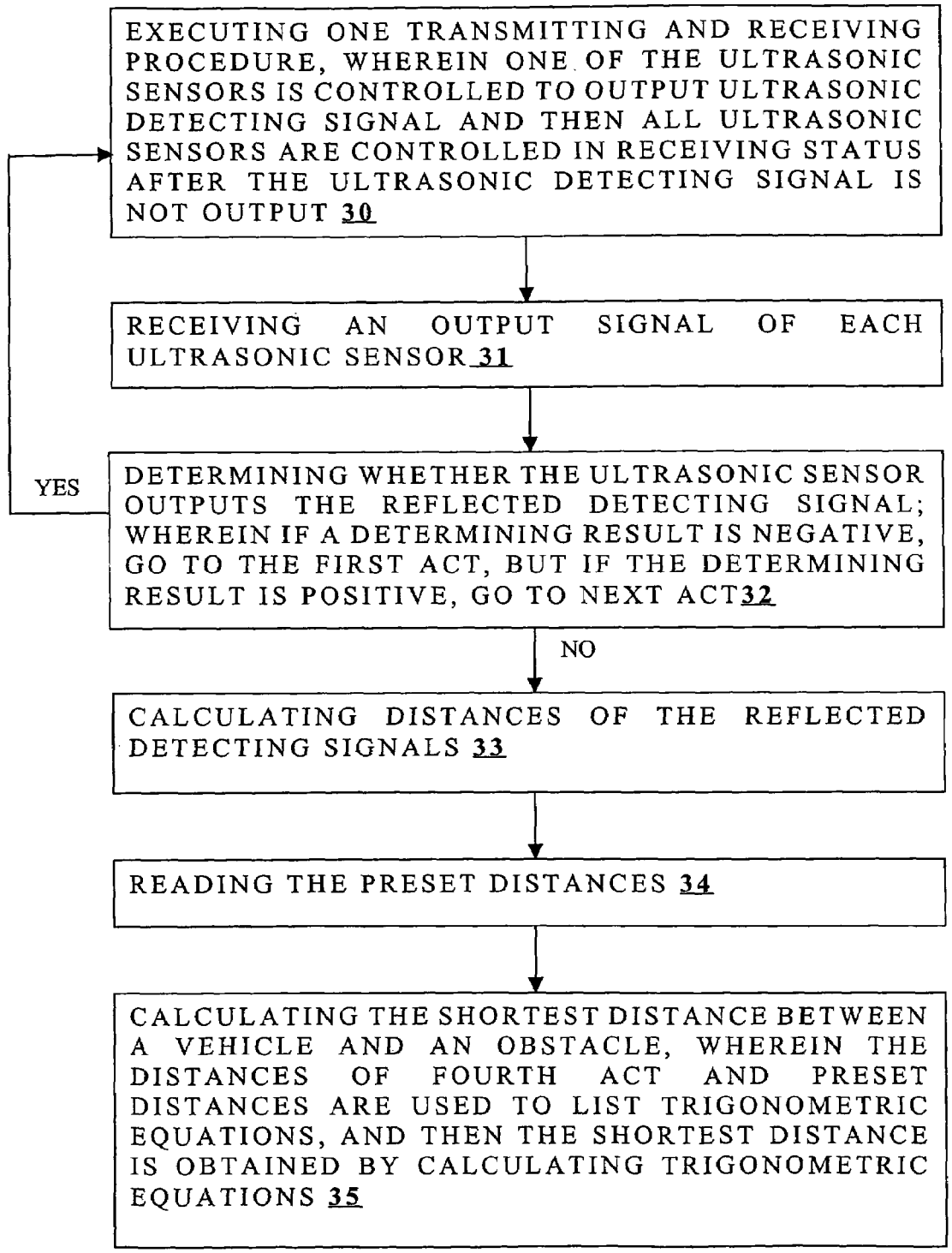
FIG. 6 is a flow chart of a transmitting and receiving procedure executed by a controller of the parking sensor apparatus in accordance with the present invention.

With further reference to FIG. 6, a flow chart of the single-transmitting and multi-receiving procedure is executed by the microprocessor has acts of:

(a) executing one transmitting and receiving procedure, wherein one of the ultrasonic sensors is controlled to output ultrasonic detecting signal and then all ultrasonic sensors are controlled in receiving status after the ultrasonic detecting signal is not output (30);

(b) receiving an output signal of each ultrasonic sensor (31);

(c) determining whether the ultrasonic sensor outputs the reflected detecting signal; wherein if a determining result is negative, go to the act (a), but if the determining result is positive, go to next act (32);

(d) calculating distances of the reflected detecting signals, wherein time differences, each of which is defined between the time which the ultrasonic detecting signal is output and the other time the corresponding reflected detecting signal is received is first calculated and then the distances corresponding different time differences are calculated (33);

(e) reading the preset distances (34); and (f) calculating the shortest distance between a vehicle and an obstacle, wherein the distances from act (d) and preset distances are used to list trigonometric equations, and then the shortest distance is obtained by calculating trigonometric equations (35).

Based on the foregoing description, the parking sensor apparatus uses time division transmitting method to make the multiple ultrasonic sensors to output ultrasonic detecting signal in order. After each ultrasonic sensor outputs the ultrasonic detecting signal, all ultrasonic sensors are controlled to be in receiving status, so the microprocessor receives the reflected detecting signals from the ultrasonic sensors. Further, since only one ultrasonic sensor outputs the ultrasonic detecting signal at a time point, the microprocessor clearly determines that the reflected detecting signal is corresponding to the present ultrasonic sensor controlled to output the ultrasonic detecting signal.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A single-transmitting and multi-receiving method of detecting obstacle, comprising acts of:
    (a) presetting a time period and multiple preset distances, wherein each present distances is defined between adjacent ultrasonic sensors mounted on a vehicle;
    (b) executing one transmitting and receiving procedure, wherein one of the ultrasonic sensors is controlled to output ultrasonic detecting signal and then all ultrasonic sensors are controlled in receiving status after the ultrasonic detecting signal is not output;
    (c) receiving an output signal of each ultrasonic sensor;
    (d) determining whether the ultrasonic sensor outputs the reflected detecting signal; wherein if a determining result is negative, go to the act (b), but if the determining result is positive, go to next act;
    (e) calculating distances of the reflected detecting signals;
    (f) reading the preset distances; and
    (g) calculating the shortest distance between a vehicle and an obstacle, wherein trigonometric equations are calculated by the distances from act (e) and the preset distances to obtain the shortest distance.

2. The method as claimed in claim 1, wherein act (e) further comprises steps of:
    calculating time differences, each of which is defined between the time which the ultrasonic detecting signal is output and the other time the corresponding reflected detecting signal is received; and
    calculating the distances corresponding different time differences according to the time differences.

3. A parking sensor apparatus, comprising
    a microprocessor having a single-transmitting and multi-receiving procedure, a time period and multiple preset distances;
    multiple ultrasonic sensors respectively connected to outputs of the microprocessor through an ultrasonic transducer and connected to inputs of the microprocessor through an ultrasonic transducer and connected to inputs of the microprocessor sequentially through an ultrasonic receiver and an analog to digital converter; and
    an alarm device connected to outputs of the microprocessor and driven by the microprocessor; wherein the single transmitting and multi-receiving procedure comprises acts of:
    (a) executing one transmitting and receiving procedure, wherein one of the ultrasonic sensors is controlled to output ultrasonic detecting signal and then all ultrasonic sensors are controlled in receiving status after the ultrasonic detecting signal is not output;
    (b) receiving an output signal of each ultrasonic sensor;
    (c) determining whether the ultrasonic sensor outputs the reflected detecting signal; wherein if a determining result is negative, go to the act (a), but if the determining result is positive, go to next act;
    (d) calculating distances of the reflected detecting signals:
    (e) reading the preset distances; and
    (f) calculating the shortest distance between a vehicle and an obstacle, wherein the distances from act (d) and preset distances are used to list trigonometric equations, and then the shortest distance is obtained by calculating trigonometric equations.

4. The parking sensor apparatus as claimed in claim 3, wherein act (d) further comprises steps of:
    calculating time differences, each of which is defined between the time which the ultrasonic detecting signal is output and the other time the corresponding reflected detecting signal is received; and
    calculating the distances corresponding different time differences according to the time differences.

* * * * *